United States Patent
Rawlinson et al.

(10) Patent No.: US 9,045,030 B2
(45) Date of Patent: Jun. 2, 2015

(54) SYSTEM FOR ABSORBING AND DISTRIBUTING SIDE IMPACT ENERGY UTILIZING AN INTEGRATED BATTERY PACK

(71) Applicant: Tesla Motors, Inc., Palo Alto, CA (US)

(72) Inventors: Peter Dore Rawlinson, Worcestershire (GB); Alan Paul Clarke, Redondo Beach, CA (US); Hitendra Laxmidas Gadhiya, Irvine, CA (US); Robert David Sumpf, Jr., San Francisco, CA (US); Bruce Philip Edwards, Menlo Park, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 14/168,351

(22) Filed: Jan. 30, 2014

(65) Prior Publication Data

US 2014/0182958 A1 Jul. 3, 2014

Related U.S. Application Data

(63) Continuation of application No. 13/308,300, filed on Nov. 30, 2011, now abandoned.

(60) Provisional application No. 61/426,254, filed on Dec. 22, 2010.

(51) Int. Cl.
*B60K 1/04* (2006.01)
*B60R 16/04* (2006.01)
*B62D 21/15* (2006.01)
(Continued)

(52) U.S. Cl.
CPC . *B60K 1/04* (2013.01); *B60R 16/04* (2013.01); *B62D 21/157* (2013.01); *B62D 25/025* (2013.01); *B62D 25/20* (2013.01); *B62D 25/2036* (2013.01)

(58) Field of Classification Search
CPC ... B60K 1/04; B60K 2001/0438; B60R 16/04
USPC .......................... 180/68.5; 280/784; 429/100
See application file for complete search history.

(56) References Cited

U.S. PATENT DOCUMENTS 2,980,195 A * 4/1961 Herbst .......................... 180/68.5
4,174,014 A 11/1979 Bjorksten
(Continued)

FOREIGN PATENT DOCUMENTS

JP 10252466 9/1998
JP 2004-257000 9/2004
(Continued)

*Primary Examiner* — Frank Vanaman
(74) *Attorney, Agent, or Firm* — J. Richard Soderberg

(57) ABSTRACT

An energy absorbing and distributing side impact system for use with a vehicle is provided, the system utilizing a battery pack enclosure that includes a plurality of cross-members that transverse the battery pack enclosure and absorb and distribute at least a portion of the load received when either the first or second side of the vehicle receives a side impact. The battery pack enclosure is positioned between the front and rear vehicle suspension assemblies and mounted between, and mechanically coupled to, vehicle structural members (e.g., rocker panels) located on either side of the vehicle. In addition to providing rigidity, strength and impact resistance, the battery pack cross-members segregate the batteries contained within the battery pack enclosure into battery groups.

20 Claims, 12 Drawing Sheets

(51) Int. Cl.
  *B62D 25/02* (2006.01)
  *B62D 25/20* (2006.01)

(56) References Cited

U.S. PATENT DOCUMENTS

| | | | |
|---|---|---|---|
| 4,336,644 A | 6/1982 | Medlin | |
| 4,352,316 A | 10/1982 | Medlin | |
| 4,365,681 A * | 12/1982 | Singh | 180/68.5 |
| 5,086,860 A | 2/1992 | Francis et al. | |
| 5,305,513 A | 4/1994 | Lucid et al. | |
| 5,501,289 A * | 3/1996 | Nishikawa et al. | 180/68.5 |
| 5,534,364 A | 7/1996 | Watanabe et al. | |
| 5,558,949 A * | 9/1996 | Iwatsuki et al. | 429/99 |
| 5,620,057 A | 4/1997 | Klemen et al. | |
| 5,624,003 A * | 4/1997 | Matsuki et al. | 180/65.1 |
| 5,639,571 A | 6/1997 | Waters et al. | |
| 5,681,668 A | 10/1997 | Reed et al. | |
| 6,085,854 A * | 7/2000 | Nishikawa | 180/68.5 |
| 6,094,927 A | 8/2000 | Anazawa et al. | |
| 6,188,574 B1 * | 2/2001 | Anazawa | 361/695 |
| 6,224,998 B1 | 5/2001 | Brouns et al. | |
| 6,227,322 B1 | 5/2001 | Nishikawa | |
| 6,547,020 B2 | 4/2003 | Maus et al. | |
| 6,632,560 B1 | 10/2003 | Zhou et al. | |
| 6,662,891 B2 | 12/2003 | Misu et al. | |
| 6,676,200 B1 | 1/2004 | Peng | |
| 6,793,274 B2 | 9/2004 | Riley et al. | |
| 7,090,293 B2 | 8/2006 | Saberan et al. | |
| 7,427,093 B2 | 9/2008 | Watanabe et al. | |
| 7,654,352 B2 | 2/2010 | Takasaki et al. | |
| 7,717,207 B2 | 5/2010 | Watanabe et al. | |
| 7,770,525 B2 | 8/2010 | Kumar et al. | |
| 7,823,672 B2 | 11/2010 | Watanabe et al. | |
| 8,007,032 B1 | 8/2011 | Craig | |
| 8,037,960 B2 | 10/2011 | Kiya | |
| 8,091,669 B2 | 1/2012 | Taneda et al. | |
| 2001/0030069 A1 | 10/2001 | Misu et al. | |
| 2002/0162696 A1 | 11/2002 | Maus et al. | |
| 2004/0016580 A1 | 1/2004 | Kronner et al. | |
| 2006/0005695 A1 | 1/2006 | Honlinger et al. | |
| 2008/0006459 A1 * | 1/2008 | Niebuhr | 180/68.5 |
| 2009/0021052 A1 | 1/2009 | Kato | |
| 2009/0186266 A1 | 7/2009 | Nishino et al. | |
| 2009/0242299 A1 | 10/2009 | Takasaki et al. | |
| 2010/0025132 A1 | 2/2010 | Hill et al. | |
| 2010/0175940 A1 | 7/2010 | Taneda et al. | |
| 2010/0273040 A1 | 10/2010 | Kubota et al. | |
| 2010/0289295 A1 | 11/2010 | Yoda et al. | |
| 2010/0307848 A1 | 12/2010 | Hashimoto et al. | |
| 2011/0300427 A1 | 12/2011 | Iwasa et al. | |
| 2012/0021301 A1 | 1/2012 | Ohashi | |
| 2012/0028135 A1 | 2/2012 | Ohashi | |
| 2012/0073888 A1 | 3/2012 | Taneda et al. | |
| 2012/0103714 A1 | 5/2012 | Choi et al. | |
| 2012/0153682 A1 | 6/2012 | Rawlinson et al. | |
| 2012/0156539 A1 | 6/2012 | Honjo et al. | |
| 2012/0161429 A1 | 6/2012 | Rawlinson et al. | |
| 2012/0161472 A1 | 6/2012 | Rawlinson et al. | |

FOREIGN PATENT DOCUMENTS

| | | |
|---|---|---|
| JP | 2004-262413 | 9/2004 |
| JP | 2008-074148 | 4/2008 |
| JP | 2009-193942 | 8/2009 |
| WO | WO 2012/063393 | 5/2012 |

* cited by examiner

SYSTEM FOR ABSORBING AND DISTRIBUTING SIDE IMPACT ENERGY UTILIZING AN INTEGRATED BATTERY PACK

CROSS-REFERENCE TO RELATED APPLICATION

The present application claims benefit of the filing date of U.S. patent application Ser. No. 13/308,300, filed Nov. 30, 2011 and U.S. Provisional Application Ser. No. 61/426,254, filed Dec. 22, 2010, the disclosure of which (including material incorporated therein by reference) is incorporated herein by reference for any and all purposes.

FIELD OF THE INVENTION

The present invention relates generally to vehicle structures and, more particularly, to means for enhancing the side impact performance of a vehicle.

BACKGROUND OF THE INVENTION

Modern vehicles use a variety of structures to protect the vehicle's occupants during a crash. Some of these structures are used to control the transmission of the crash energy to the passenger compartment while other structures, such as seat belts, head restraints, and air bags, are intended to restrain passenger movement during a crash, thereby preventing the passengers from hurting themselves as their bodies react to the crash forces. Side impact collisions present a particularly challenging problem to vehicle safety engineers, both due to the relatively low position of the rocker panels on many small vehicles as well as the difficulty of implementing an impact resistant side structure while taking into account vehicle doors and doorways.

U.S. Pat. No. 6,676,200, issued 13 Jan. 2004, discloses an automotive structure utilizing inner and outer rocker panels, a floor pan joined to the inner rocker panels, and a plurality of cross-members that extend laterally across a portion of the vehicle body. The cross-members include energy absorbing extensions designed to absorb side impact loads.

An alternate approach to achieving impact resistance is disclosed in U.S. Pat. No. 6,793,274, issued 21 Sep. 2004, in which an energy management system is integrated within various automotive structural components, e.g., vehicle frames and rails. In particular, the disclosed system uses members or inserts that are in some way attached to selected structural components of the vehicle, the members designed to both absorb and redirect the impact energy encountered during a crash. The disclosed members also help to reinforce the components to which they are attached. The patent describes a variety of ways in which the disclosed members may be incorporated into a vehicle during the manufacturing process.

U.S. Pat. No. 7,090,293, issued 15 Aug. 2006, attempts to achieve improved occupant protection through a seat assembly that is designed to provide side impact rigidity and resistance to rocker override and side impact intrusions. The disclosed seat assembly includes a frame track, a frame base slidably engaged to the frame track, a frame back rotatably engaged to the frame base, and a rear lateral support assembly that includes a support frame attached to the rear portion of the frame base. The support frame includes a tubular member that is designed to engage with a vehicle rocker panel during impact, thereby providing additional rigidity and strength to the vehicle.

U.S. Pat. No. 8,007,032, issued 30 Aug. 2011, discloses an automotive energy absorbing side structure that includes a wide-based B-pillar with an internal reinforcing tube, a rocker with an internal bulkhead, a rear rocker, and at least one cross-member extending inward from the rocker. The disclosed cross-members are designed to transfer impact loads to the floor, the cross-members and the tunnel brace.

Although vehicle manufacturers use a variety of structures and components to protect a vehicle's occupants during a side impact collision, typically these approaches provide only limited protection while significantly increasing vehicle weight. Accordingly, what is needed is a system that provides superior vehicle occupant safety, particularly from side impact collisions, while adding minimal weight from impact resistant dedicated structures. The present invention provides such a system.

SUMMARY OF THE INVENTION

The present invention provides an energy absorbing and distributing side impact system for use with a vehicle, the system utilizing a battery pack enclosure that includes a plurality of cross-members that transverse the battery pack enclosure and absorb and distribute at least a portion of the load received when either the first or second side of the vehicle receives a side impact. In accordance with the invention, the battery pack enclosure is positioned between the front and rear vehicle suspension assemblies and mounted between, and mechanically coupled to, vehicle structural members (e.g., rocker panels) located on either side of the vehicle. The battery pack side members may include extended regions that simplify mechanically coupling the battery pack enclosure to the vehicle structural members. In addition to providing rigidity, strength and impact resistance, the battery pack cross-members segregate the batteries contained within the battery pack enclosure into battery groups. The battery pack cross-members may also be used to thermally segregate battery groups from one another. Preferably the battery pack enclosure is mounted below the vehicle floor panel.

The cross-members integrated into the battery pack enclosure of the invention may include one or more cavities that extend the entire cross-member length, where the cavities may be unfilled or configured to contain a high melting temperature, low thermal conductivity material or configured to contain a liquid; the cross-members may be fabricated from aluminum (e.g., extruded aluminum), an aluminum alloy (e.g., extruded aluminum alloy), steel, or other material; the cross-members may be comprised of an upper member and a lower member; the cross-members may be comprised of an upper member that includes at least one cavity that extends the entire cross-member length and a lower member that includes at least one cavity that extends the entire cross-member length; and the cross-members may be comprised of an upper member that is mechanically coupled to the battery pack enclosure top panel and a lower member that is mechanically coupled to the battery pack enclosure bottom panel.

The battery pack enclosure may be configured as a substantially airtight enclosure. The battery pack enclosure, including side members, top panel and bottom panel, may be fabricated from aluminum, an aluminum alloy, steel, or other material. The battery pack bottom panel may be welded, brazed, soldered or bonded to the enclosure side members. The battery pack top panel may be bolted to the enclosure side members.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein refers to either an all-electric vehicle, also referred to as an EV, plug-in hybrid vehicles, also referred to as a PHEV, or a hybrid vehicle (HEV), a hybrid vehicle utilizing multiple propulsion sources one of which is an electric drive system.

Figure 1:
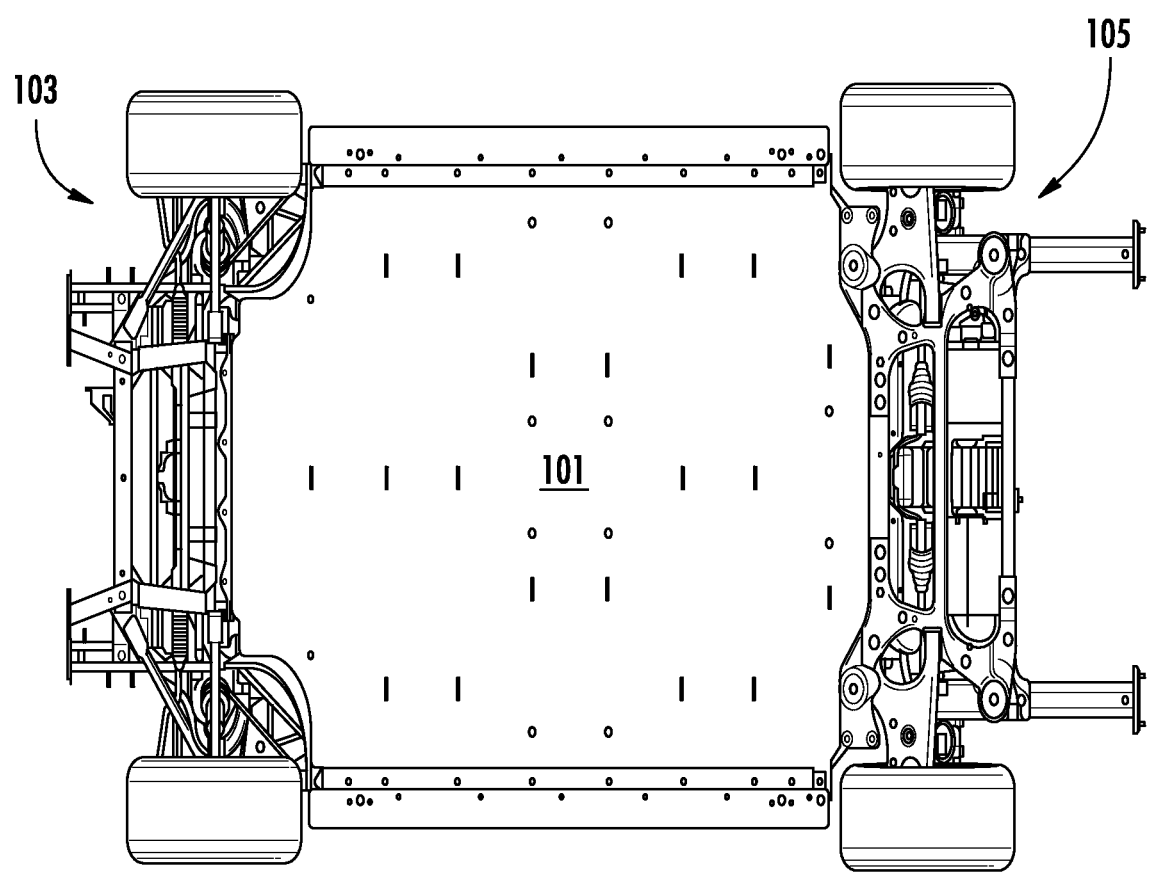
FIG. 1 provides a simplified bottom view of an electric vehicle with a battery pack incorporated into the vehicle structure.
Figure 2:
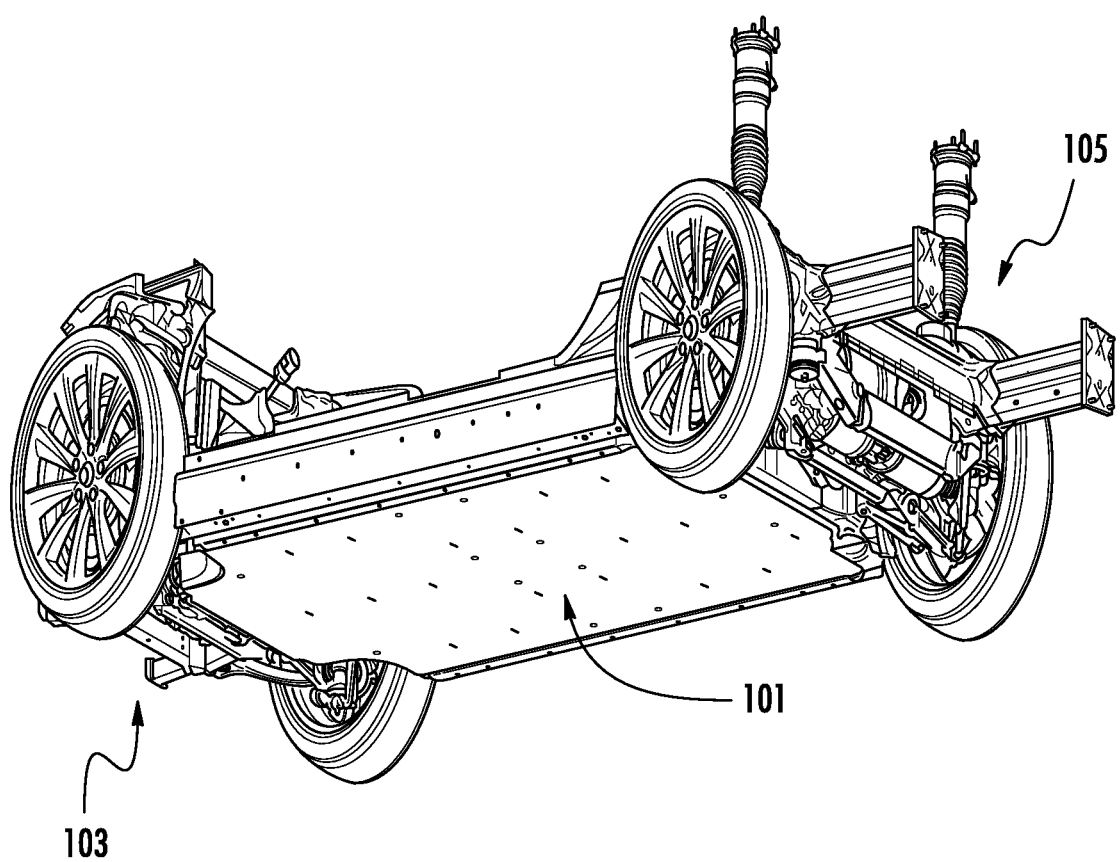
FIG. 2 provides a perspective view of a vehicle's undercarriage with the battery pack incorporated into the vehicle structure.
Figure 3:
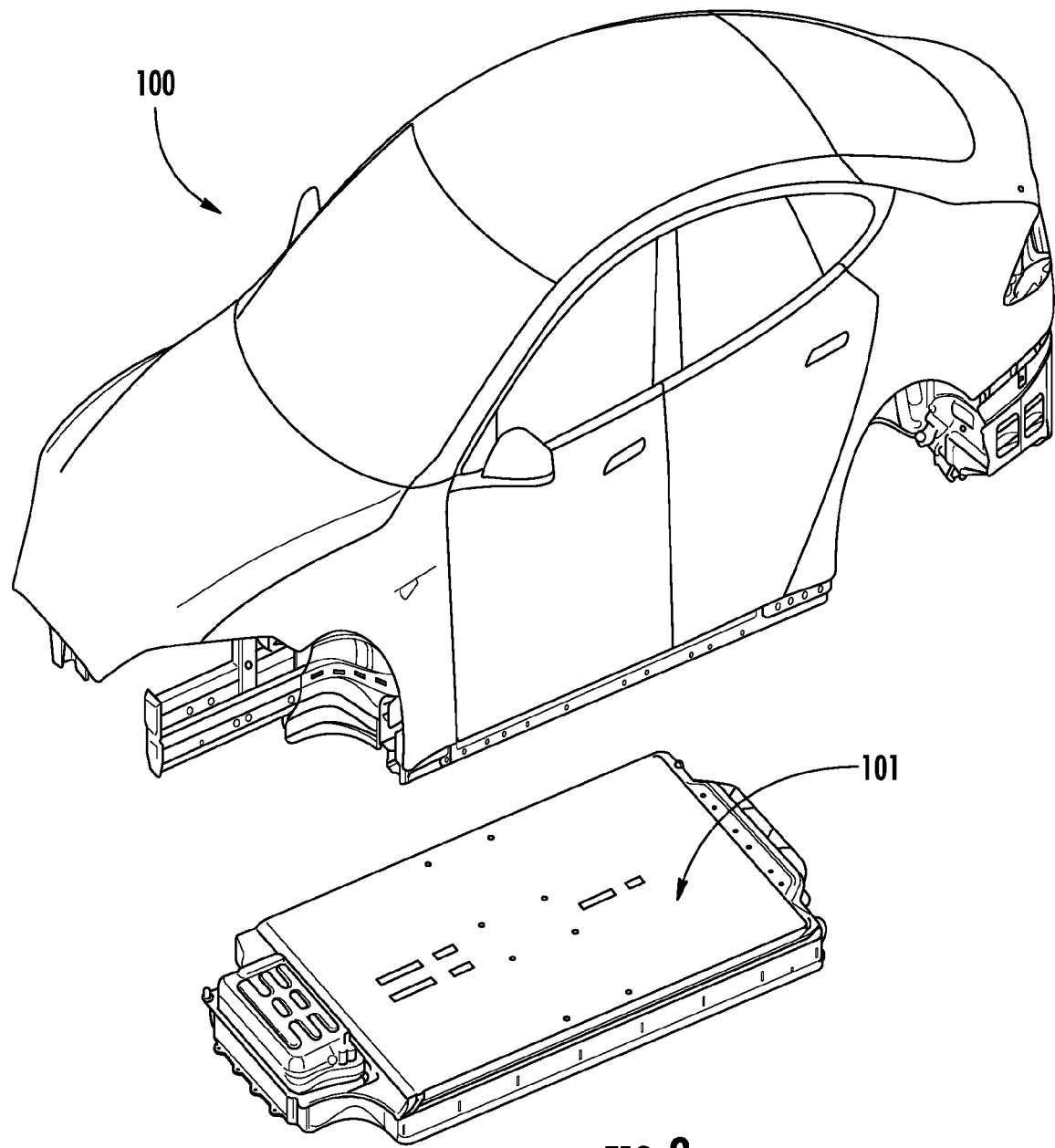
FIG. 3 provides a perspective view of a portion of a vehicle body and frame with the battery pack separated from the structure.

The present invention integrates a battery pack into an electric vehicle in order to add rigidity to the vehicle structure and significantly increase the vehicle's side impact resistance by absorbing and distributing the impact load throughout the battery pack structure. To achieve the desired level of structural rigidity, strength and impact resistance, preferably the battery pack is large relative to the overall dimensions of the vehicle and includes multiple cross-members as described in detail below. In a preferred embodiment of the invention illustrated in FIGS. 1-3, battery pack 101 not only transverses the width of the vehicle, i.e., from rocker panel to rocker panel, but also extends most of the distance between the front suspension 103 and the rear suspension 105. It will be appreciated that while smaller battery packs may be used with the invention, they may not provide the same level of side impact protection, depending upon their size and the number of integrated cross-members. In the illustrated embodiment, battery pack 101 is approximately 2.7 meters long and 1.5 meters wide. The thickness of battery pack 101 varies from approximately 0.1 meters to 0.18 meters, the thicker dimension applicable to those portions of the battery pack in which battery modules are positioned one on top of another, as described further below.

Figure 4:
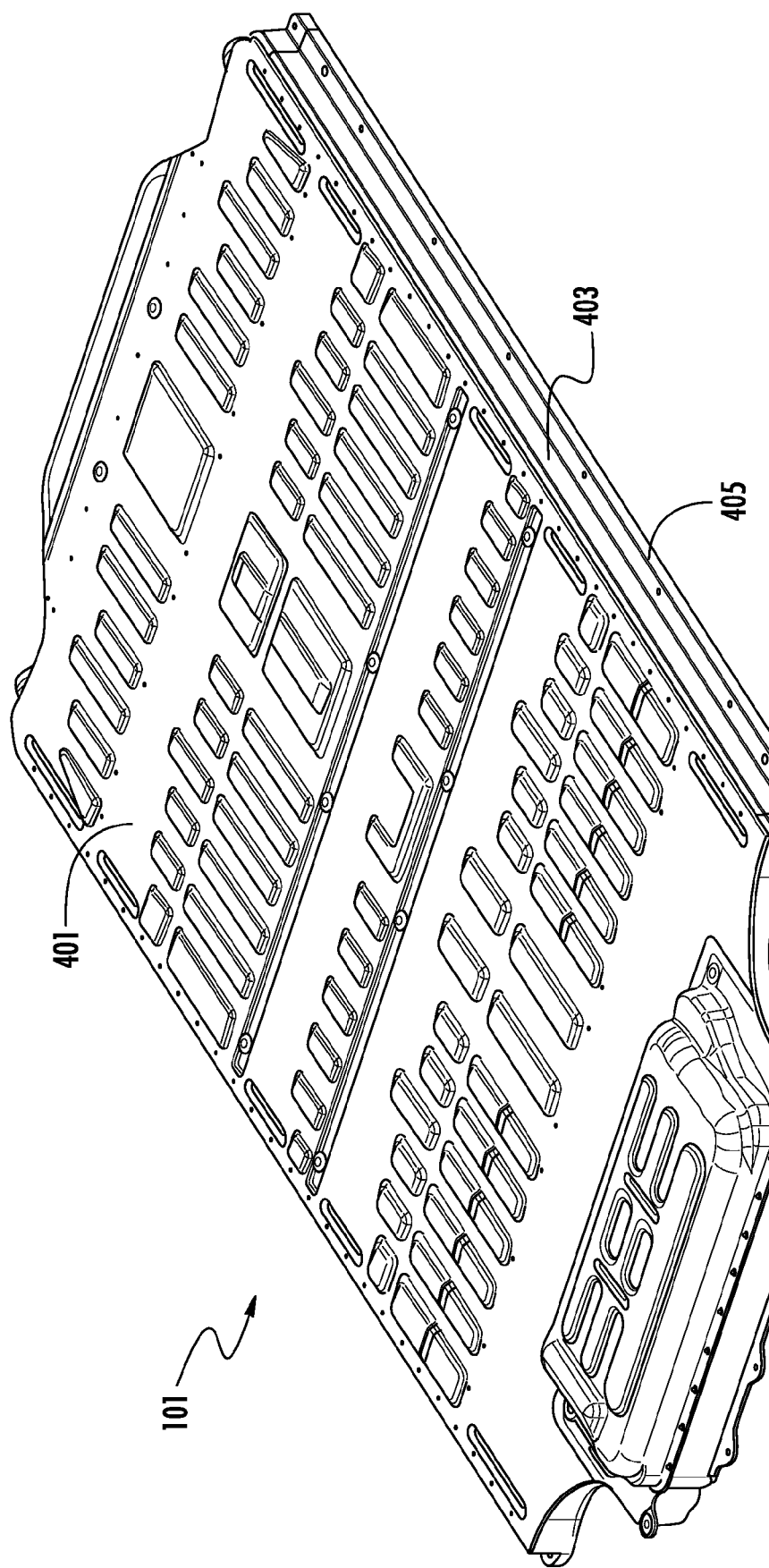
FIG. 4 provides a perspective view of the battery pack shown in FIGS. 1-3.
Figure 5:
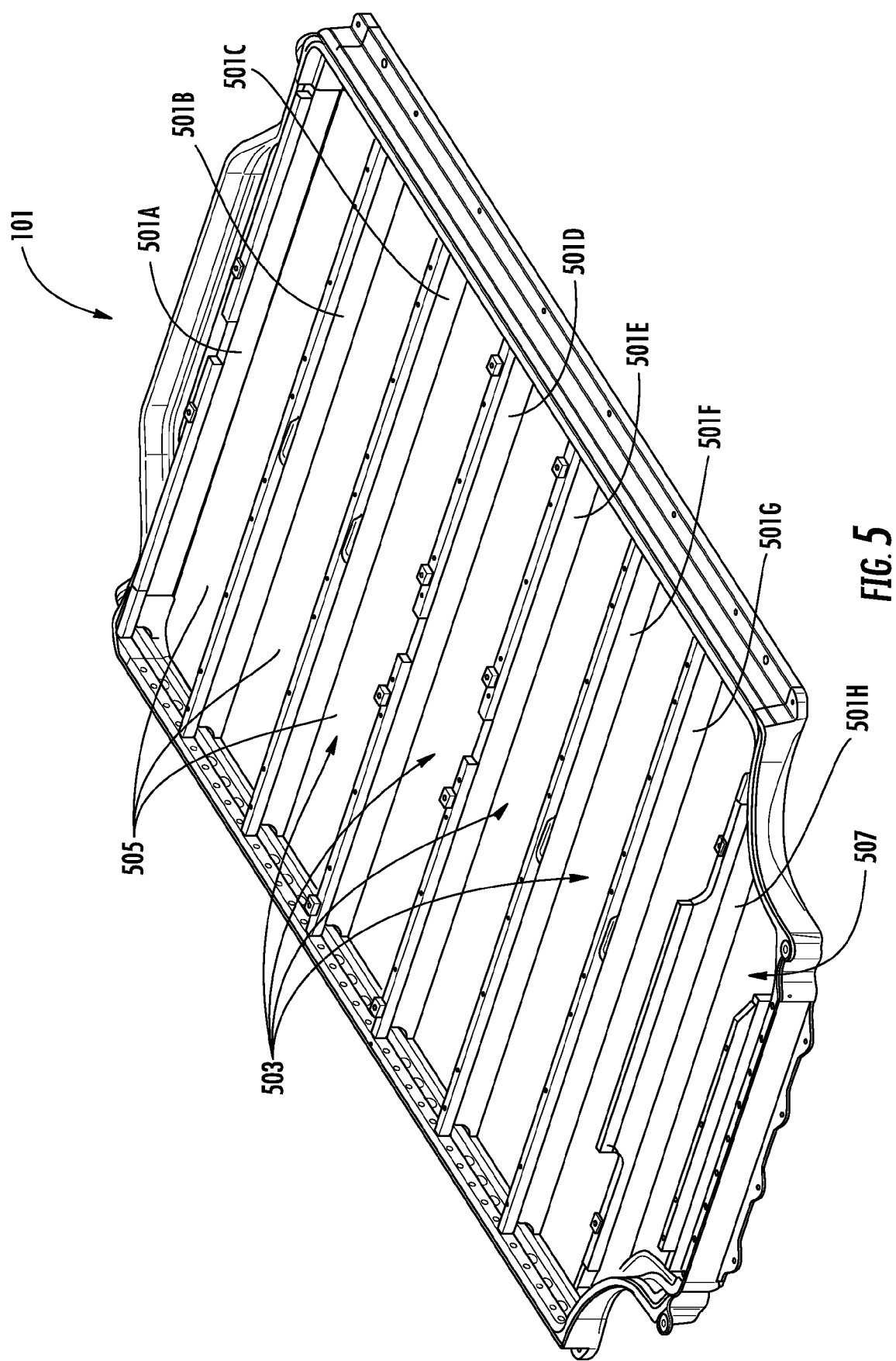
FIG. 5 provides a perspective view of the battery pack shown in FIGS. 1-4, with the top panel removed.

FIG. 4 provides a perspective view of battery pack 101 with the top enclosure panel 401 in place, panel 401 preferably providing a substantially airtight seal. Hollow side structural elements 403 are also visible, members 403 preferably including an extended region or lip 405 that is used to mechanically and thermally couple the side members 403 to the vehicle structure (not shown in this figure). FIG. 5 shows battery pack 101 with top member 401 removed, this view showing cross-members 501A-501H. The number of cross-members is based on the number of cells/cell modules that are to be encased within the battery pack as well as the desired structural characteristics of the battery pack. Preferably battery pack side members 403, including extended region 405, battery pack top panel 401 and battery pack bottom panel 505 are each fabricated from a light weight metal, such as aluminum or an aluminum alloy, although other materials such as steel may be used for some or all of the battery pack components. Bottom panel 505 may be welded, brazed, soldered, bonded or otherwise attached to side members 403, with the resultant joint between panel 505 and member 403 preferably being substantially air-tight as well as being strong enough to allow bottom panel 505 to support the batteries contained within the pack. Top panel 401 is typically attached to member 403 using bolts or similar means, thus simplifying battery replacement as well as allowing battery interconnects, battery pack components, cooling system components and other battery pack components to be repaired and/or replaced.

Cross-members 501A-501H provide several benefits. First and foremost relative to side impact resistance, members 501A-501H provide mechanical and structural strength and rigidity to the battery pack and to the vehicle to which the battery pack is attached. Additionally, cross-members 501A-501H help to segregate thermal events by providing a thermal barrier between groups of cells as well as minimizing gas flow between sections 503, sections 503 being defined by the cross-members, side members 403, top member 401 and bottom member 505. By segregating thermal events within smaller groups of cells, thermal runaway propagation is limited as is the potential for battery pack damage.

Figure 6:
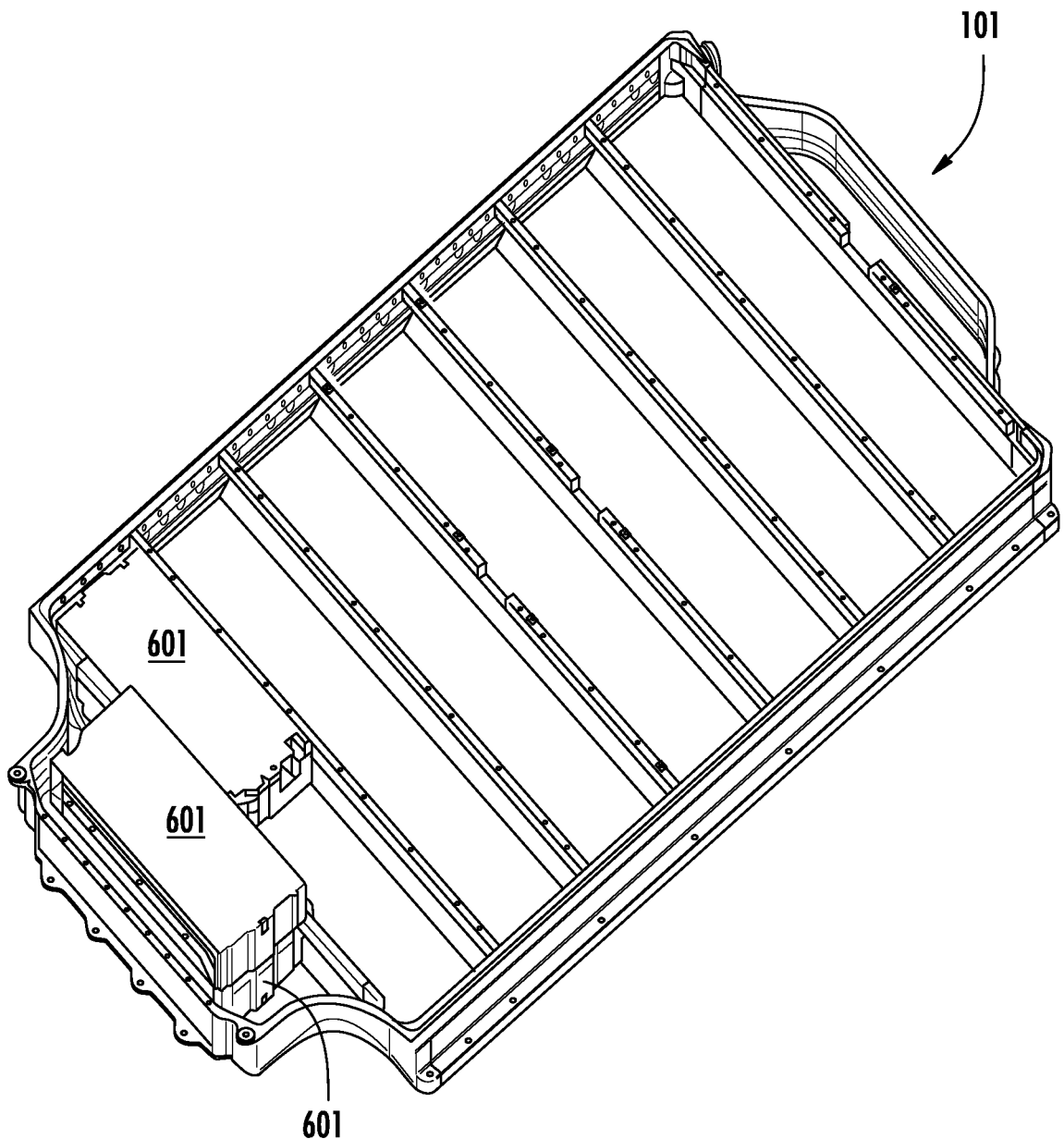
FIG. 6 provides a perspective view of the battery pack shown in FIGS. 1-5, this view showing three of the battery modules in place within the pack.

FIG. 6 shows a similar view to that provided by FIG. 5, with the inclusion of a couple of cell modules 601. In this illustration, a single module 601 is shown positioned within one of the seven, larger sections 503 of battery pack 101. Note that each large section 503 is designed to house a pair of battery pack modules 601. Additionally, in this illustration there are two modules 601 stacked one on top of the other in the front section 507 of pack 101. Note that in the preferred embodiment, each module 601 contains 370 individual cells, each cell utilizing an 18650 form factor. It should be understood, however, that this configuration is only exemplary of a preferred embodiment and that the invention is equally applicable to other configurations, for example utilizing batteries with a different form factor, a larger or smaller number of cells, individual cells versus modules, etc.

Figure 7:
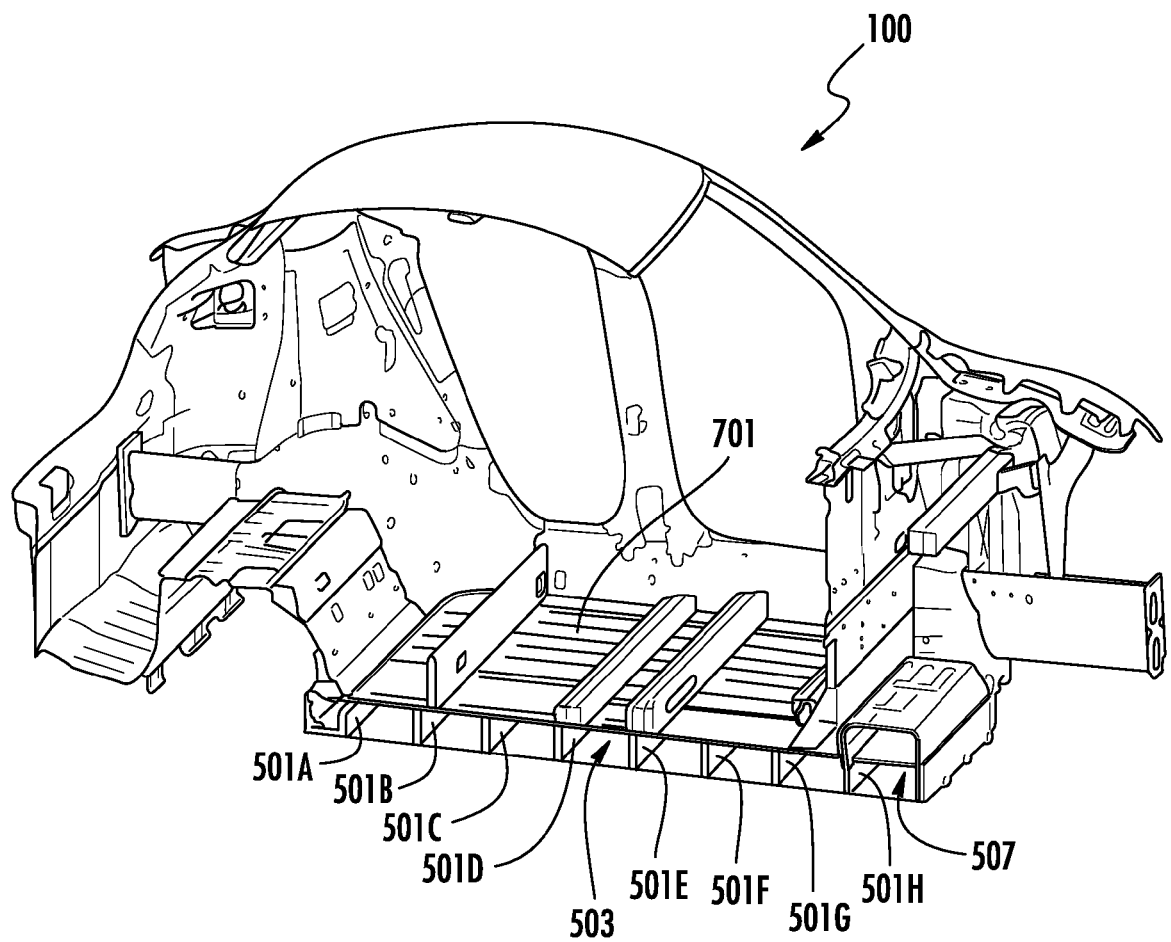
FIG. 7 provides a perspective, cross-sectional view of the battery pack shown in FIGS. 1-6 mounted under the floor panel of the vehicle shown in FIG. 3.

FIG. 7 provides a perspective, cross-sectional view of battery pack 101 mounted under floor panel 701 of vehicle 100. This view also provides additional views of the cross-members. As shown by the cross-sectional view, in the preferred embodiment cross-members 501A-501H do not utilize the same cross-section; rather the cross-section of each is optimized for each member's location within the pack. In general, cross-members 501A-501H may either be comprised of a single unit or, as preferred and illustrated, comprised of an upper member and a lower member. One or both members may be hollow, thus achieving the desired rigidity and strength while minimizing weight. It should be understood that not only can the configuration/design of the cross-members vary, depending upon their location within the pack, so can the materials comprising the cross-members. Therefore while cross-members 501A-501H are preferably fabricated from aluminum or an aluminum alloy, for example using an extrusion process, other materials (e.g., steel, ceramics, etc.) may also be used if such materials fit both the mechanical and thermal goals for the particular cross-member in question. Additionally, the lumens within one or more of the cross-members may be unfilled or filled with a high melting temperature, low thermal conductivity material (e.g., fiberglass or similar materials). Alternately, the lumens within the cross-members may include a liquid (e.g., water), the liquid being either stagnant or flowing. If stagnant, the liquid may be contained within the lumens themselves or, as preferred, contained within pouches that fit within the cavities. If the liquid is flowing, it is preferably contained within tubing that is inserted within the cross-member cavities and either coupled to a battery cooling system or used in a stand-alone circulation system.

Figure 8:
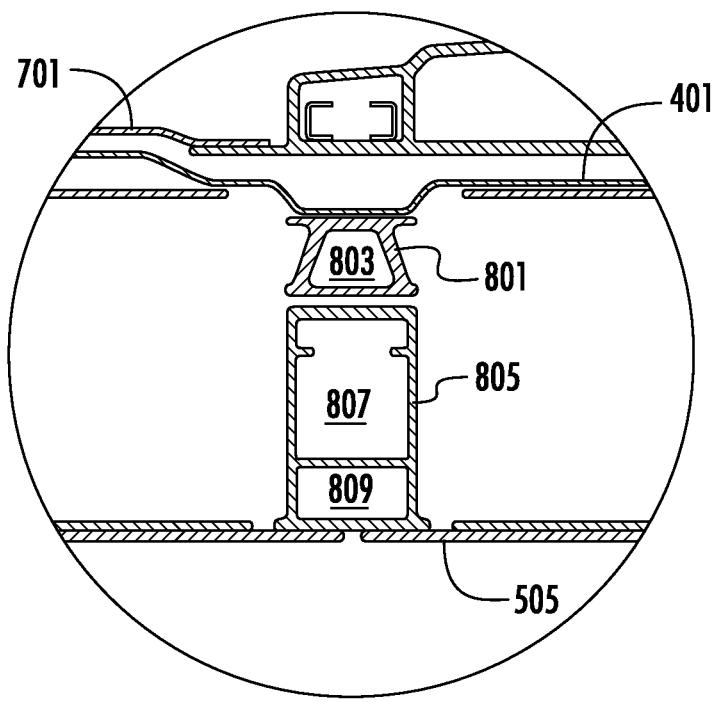
FIG. 8 provides a detailed cross-sectional view of one of the cross-members shown in FIG. 7.

In the preferred embodiment, and as illustrated in FIG. 7, cross-members 501D and 501E are larger than the other central cross-members. The reason for the increased size is to provide additional cross-member strength at those locations that are most critical to achieving the desired level of side-impact resistance. As shown in the detailed cross-sectional view of FIG. 8, in the preferred embodiment cross-members 501D and 501E are comprised of an upper member 801 that is attached to battery pack top panel 401 and includes a single lumen 803, and a lower member 805 that is attached to battery pack bottom panel 505 and includes a pair of lumens 807 and 809. In this embodiment, member 801 is approximately 19 millimeters high, 30 millimeters wide, and has a wall thickness of between approximately 2 and 3 millimeters. Member 805 is approximately 54 millimeters high, 26 millimeters wide, and has a wall thickness of between approximately 2 and 3 millimeters.

Figure 9:
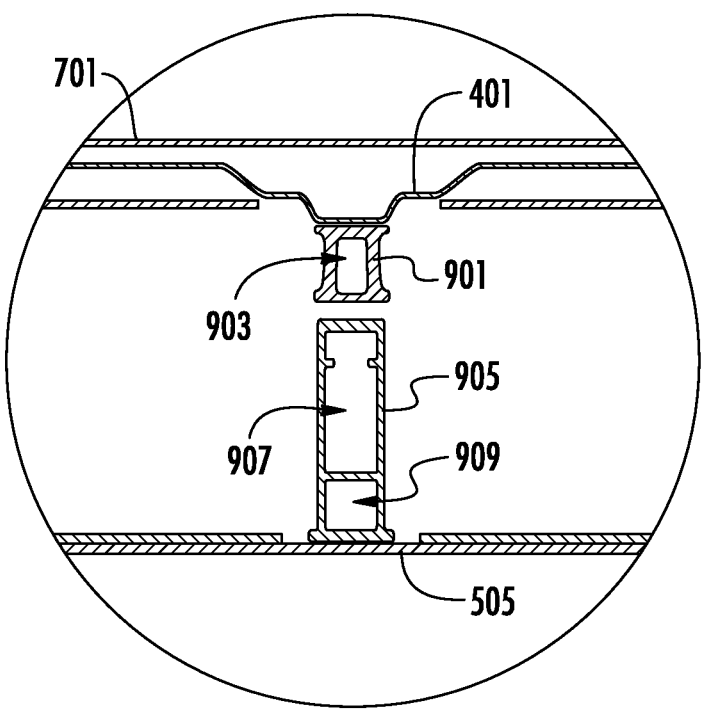
FIG. 9 provides a detailed cross-sectional view of an alternate cross-member.

Cross-members 501B, 501C, 501F and 510G are slightly smaller than cross-members 501D and 501E, although they retain the basic shape of the larger cross-members. As shown in the detailed cross-sectional view of FIG. 9, these cross-members are comprised of an upper member 901 that is attached to battery pack top panel 401 and includes a single lumen 903, and a lower member 905 that is attached to battery pack bottom panel 505 and includes a pair of lumens 907 and 909. In this embodiment, member 901 is approximately 19 millimeters high, 16 millimeters wide, and has a wall thickness of between approximately 2 and 3 millimeters. Member 905 is approximately 54 millimeters high, 16 millimeters wide, and has a wall thickness of between approximately 2 and 3 millimeters. Note that the spacing between upper member 801 and lower member 805, and the spacing between upper member 901 and lower member 905, is used in the preferred embodiment to capture a battery module mounting bracket (not shown in FIGS. 8 and 9).

Figure 10:
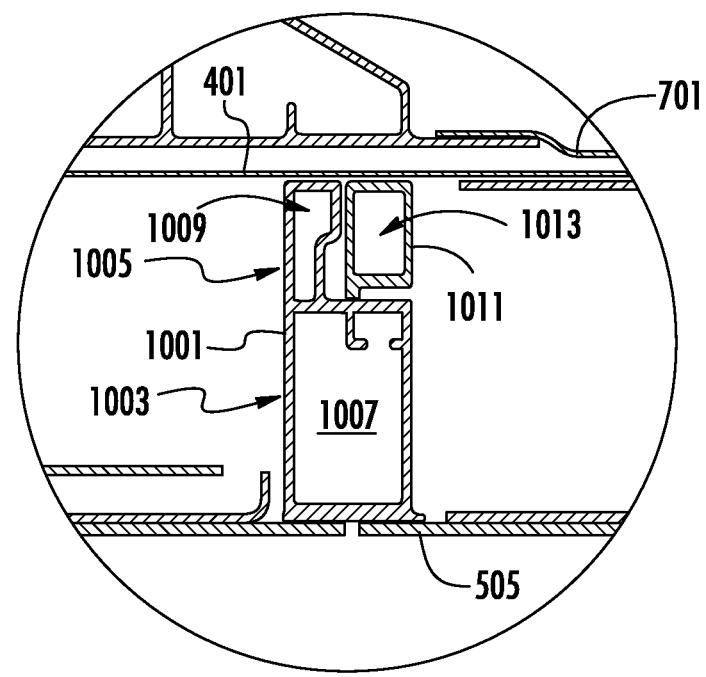
FIG. 10 provides a detailed cross-sectional view of an alternate cross-member.

Cross-member 501A, located near the rear of battery pack 101 and illustrated in the detailed cross-section of FIG. 10, includes a first member 1001 that extends from battery pack lower panel 505 to battery pack top panel 401. Member 1001 is comprised of a large lower section 1003 and a small upper section 1005 with respective lumens 1007 and 1009. Section 1003 of member 1001 is approximately 54 millimeters high, 30 millimeters wide, and has a wall thickness of between approximately 2 and 4 millimeters. Section 1005 of member 1001 is approximately 29 millimeters high, 13 millimeters wide, and has a wall thickness of between approximately 2 and 3 millimeters. Cross-member 501A also includes a second member 1011 that includes a single lumen 1013 as shown. Member 1011 is approximately 29 millimeters high, 16 millimeters wide, and has a wall thickness of between approximately 2 and 3 millimeters.

Figure 11:
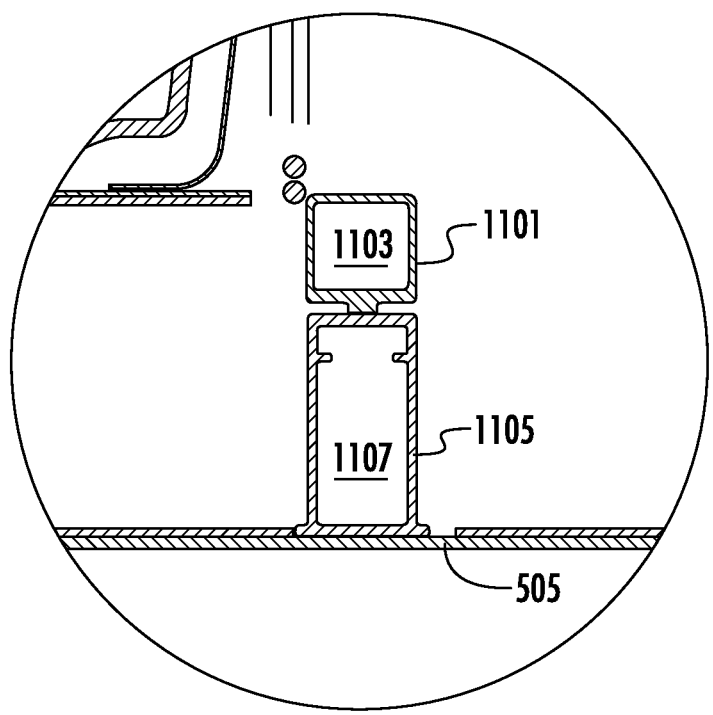
FIG. 11 provides a detailed cross-sectional view of an alternate cross-member.

Cross-member 501H shown in the detailed view of FIG. 11, is located near the front of battery pack 101 and between battery pack section 507 and the adjacent section 503. As section 507 is designed to house two battery pack modules, one on top of the other, this portion of battery pack 101 utilizes a different design which, in turn, affects the design of cross-member 501H. As shown, cross-member 501H includes an upper member 1101 that has a single lumen 1103, and a lower member 1105 that has a single lumen 1107. Member 1101 is approximately 54 millimeters high, 26 millimeters wide, and has a wall thickness of between approximately 2 and 3 millimeters. Member 1105 is approximately 29 millimeters high, 26 millimeters wide, and has a wall thickness of between approximately 2 and 3 millimeters.

Figure 12:
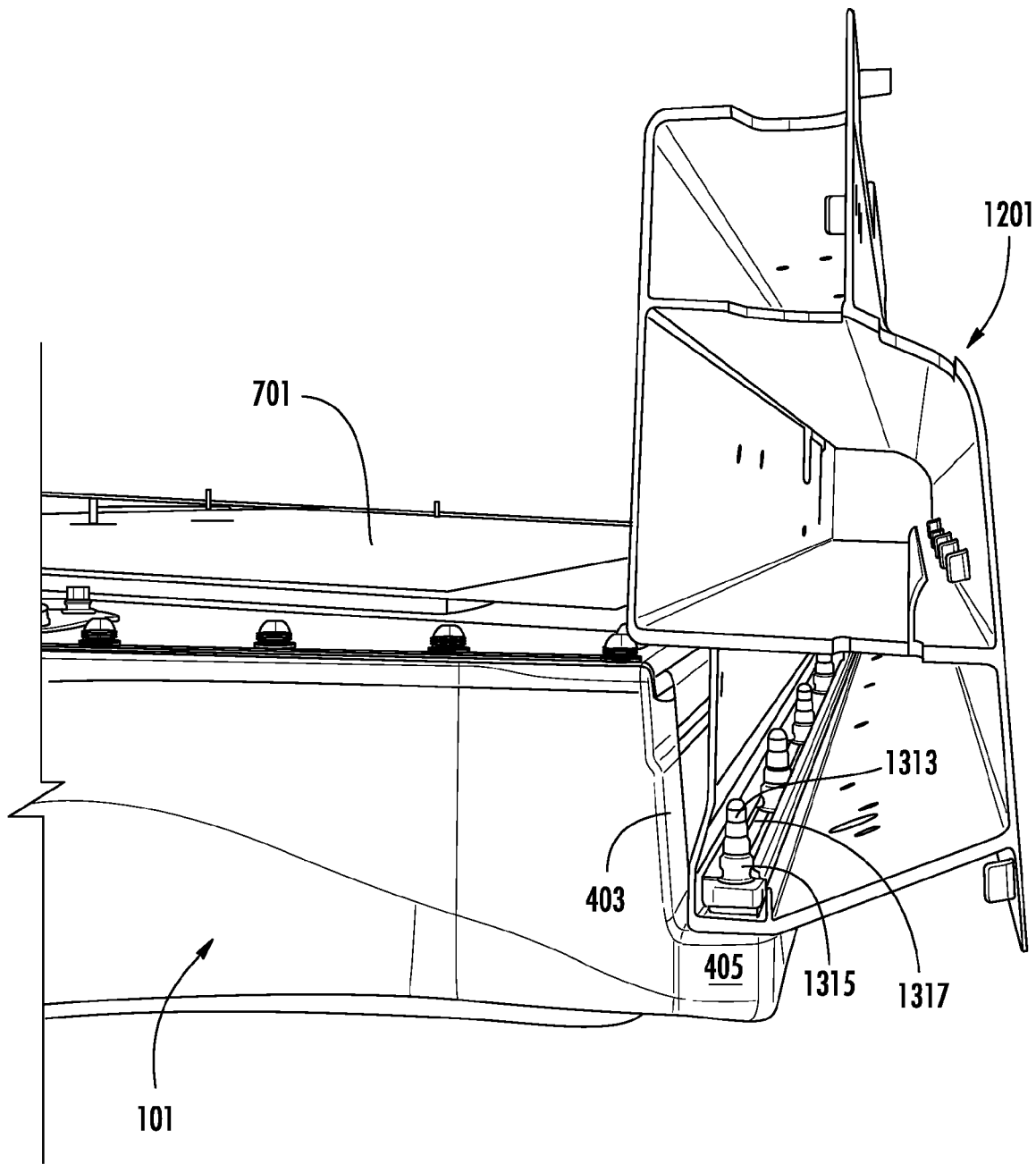
FIG. 12 provides a perspective view of the battery pack to rocker panel assembly.
Figure 13:
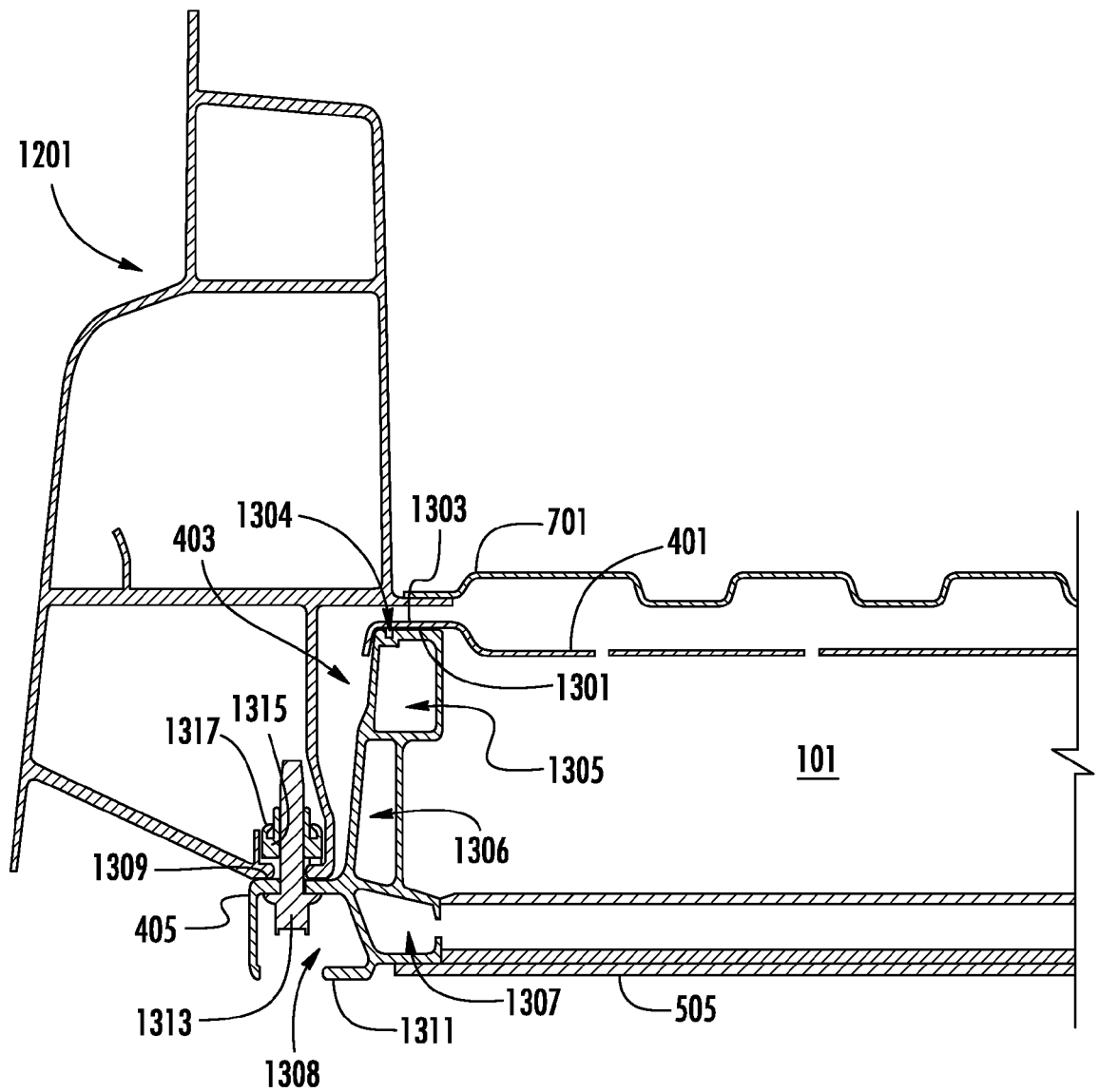
FIG. 13 provides a cross-sectional view of the assembly shown in FIG. 12.

FIGS. 12 and 13 provide perspective and cross-sectional views, respectively, that illustrate the attachment of the battery pack 101 to vehicle structural side member 1201. In the preferred embodiment structural side member 1201 is comprised of a rocker panel, also referred to herein as a sill, which is formed from extruded aluminum or an aluminum alloy (although other materials such as steel may be used for members 1201). Preferably a seal or gasket is located between the top surface 1301 of side members 403 and the bottom surface 1303 of the top panel 401, thus achieving a substantially air-tight seal. An o-ring groove 1304 is visible in FIG. 13 for use with such a seal. In the illustrated embodiment, each side member 403 includes four lumens 1305-1308. Lower exterior lumen 1308 is positioned under the extended region 405 of side member 403. Lumen 1308 is perforated on upper surface 1309 and lower surface 1311, the perforations on these two surfaces being aligned such that bolts 1313, or similar means, may pass completely through lumen 1308, thereby allowing bolts 1313 to couple extended region 405 of member 403 to structural side member 1201 as shown. Bolts 1313 and channel nuts 1315 securely attach side members 403, and therefore battery pack 101, to the vehicle's structural members 1201. Preferably channel nuts 1315 are held in place during assembly using channel nut retainer 1317. In addition to providing a strong mechanical coupling, this approach allows battery pack 101 to be quickly and efficiently removed from underneath vehicle 101.

Figure 14:
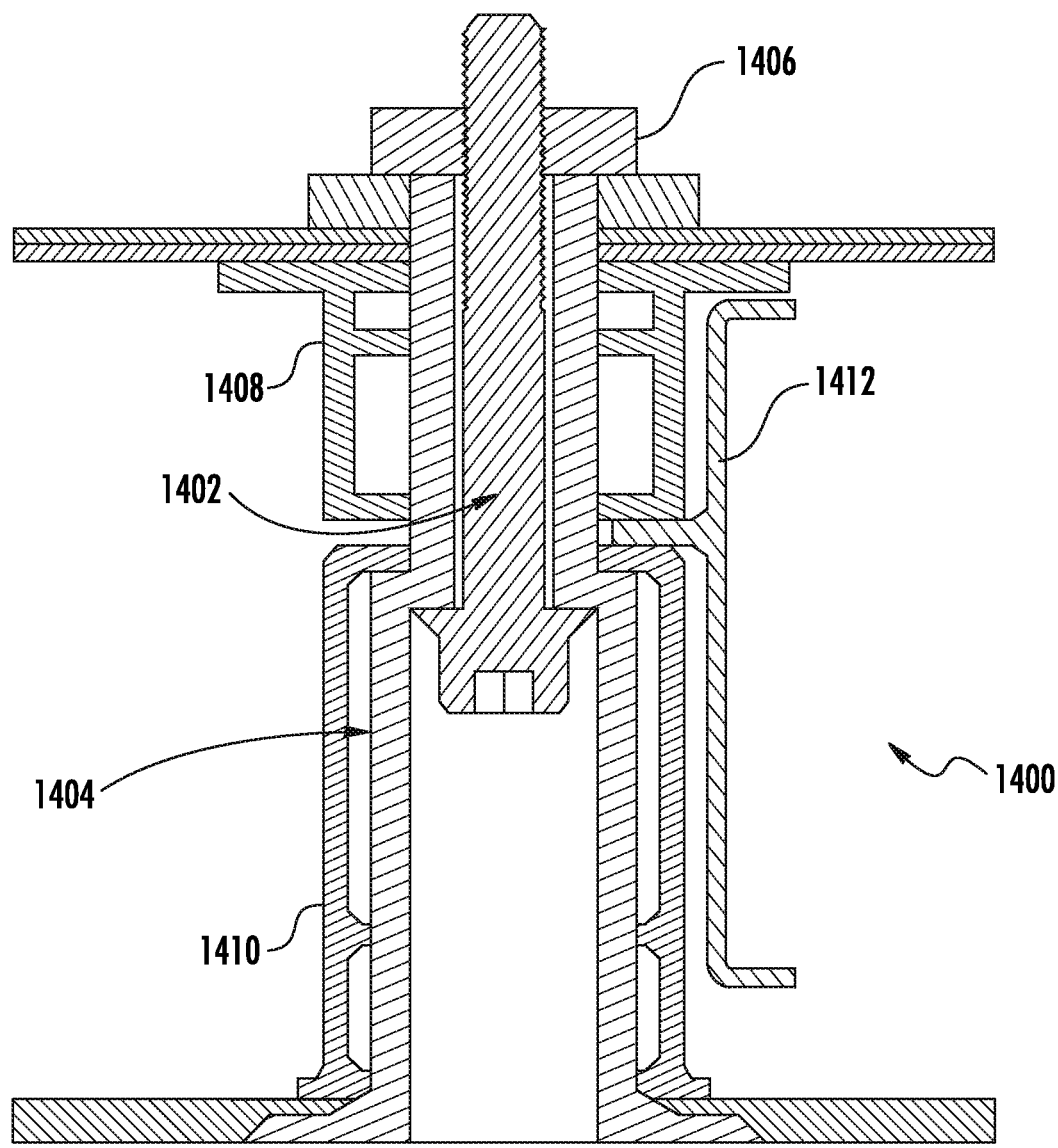
FIG. 14 provides a cross-sectional view of a structural support element.

FIG. 14 provides a cross-sectional view of a structural support element 1400. A bolt 1402 penetrates a metallic sleeve 1404 that is welded to the structure. Bolt 1402 threads through a nut 1406, for example in a cross-member of the vehicle structure. This interface is then sealed at multiple interfaces when the bolt is tightened and provides additional clamping force to the battery mounts. Here, spacing between an upper member 1408 and a lower member 1410 is used to capture a battery module mounting bracket 1412.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

What is claimed is:

1. An energy absorbing and distributing side impact system for a vehicle comprising:
a battery pack enclosure mounted between front and rear suspensions of the vehicle, the battery pack enclosure having a first side member attached to a first side sill, and a second side member attached to a second side sill; and
cross-members integrated into the battery pack enclosure, each of the cross-members extending from the first to the second side member, the cross-members segregating the battery pack enclosure into sections each configured to hold one or more battery modules, each cross-member comprising an upper portion and a lower portion, wherein a spacing between the upper and the lower portions is configured to receive a mounting bracket for at least one of the battery modules, and wherein each of the first and second side sills comprises multiple longitudinal channels, at least an upper longitudinal channel positioned above a vehicle floor panel and at least a lower longitudinal channel positioned below the vehicle floor panel, wherein the first side member is attached to the lower longitudinal channel of the first side sill and the second side member is attached to the lower longitudinal channel of the second side sill.

2. The energy absorbing and distributing side impact system of claim 1, wherein said first side sill is a left side rocker panel, and wherein said second side sill is a right side rocker panel.

3. The energy absorbing and distributing side impact system of claim 1, said first side member of said battery pack enclosure further comprising an extended region mechanically coupled to a first vehicle structural side member lower surface, and said second side member of said battery pack enclosure further comprising an extended region mechanically coupled to a first vehicle structural side member lower surface, and said second side member of said battery pack enclosure further comprising an extended region mechanically coupled to a second vehicle structural side member lower surface.

4. The energy absorbing and distributing side impact system of claim 3, wherein said extended region of said first side member of said battery pack enclosure is bolted using a first plurality of bolts to said first vehicle structural side member lower surface, and wherein said extended region of said second side member of said battery pack enclosure is bolted using a second plurality of bolts to said second vehicle structural side member lower surface.

5. The energy absorbing and distributing side impact system of claim 1, wherein said battery pack enclosure is substantially airtight.

6. The energy absorbing and distributing side impact system of claim 1, wherein each of said cross-members includes at least one cavity extending an entire length of said corresponding cross-member.

7. The energy absorbing and distributing side impact system of claim 6, wherein each of said cross-members is fabricated from extruded aluminum.

8. The energy absorbing and distributing side impact system of claim 6, wherein each of said cross-members is fabricated from an extruded aluminum alloy.

9. The energy absorbing and distributing side impact system of claim 6, wherein each cavity of said at least one cavity corresponding to each cross-member of said cross-members is filled with a high melting temperature, low thermal conductivity material.

10. The energy absorbing and distributing side impact system of claim 6, wherein a liquid is contained within each cavity of said at least one cavity corresponding to each cross-member of said cross-members.

11. The energy absorbing and distributing side impact system of claim 1, wherein said upper portion of each of said cross-members includes at least one cavity extending an entire upper portion length, and wherein said lower portion of each of said cross-members includes at least one cavity extending an entire lower portion length.

12. The energy absorbing and distributing side impact system of claim 1, wherein each of said cross-members is fabricated from a material selected from the group of materials consisting of aluminum, aluminum alloys and steel.

13. The energy absorbing and distributing side impact system of claim 1, wherein the upper and lower portions are joined to each other by a fastener that penetrates a sleeve attached to a panel of the battery pack enclosure.

14. The energy absorbing and distributing side impact system of claim 1, wherein the spacing is configured to receive mounting brackets on each side of the lower portion of the cross-member.

15. The energy absorbing and distributing side impact system of claim 1, wherein each of the first and second side members comprises at least first through fourth lumens, wherein at least the first, second and third lumens are arranged in an essentially vertical configuration, and wherein at least the fourth lumen is arranged outward of the third lumen.

16. The energy absorbing and distributing side impact system of claim 15, wherein the first side member is attached to the first side sill by way of at least one fastener in the fourth lumen.

17. The energy absorbing and distributing side impact system of claim 16, wherein the fastener is oriented vertically in attaching the first side member and the first side sill to each other.

18. The energy absorbing and distributing side impact system of claim 1, wherein the cross-members segregate the battery pack enclosure into full-width sections and at least one other section, each of the full-width sections fitting two battery modules side-by-side in a direction of travel, the other section fitting two stacked battery modules.

19. An energy absorbing and distributing side impact system for a vehicle comprising:
a battery pack enclosure mounted between front and rear suspensions of the vehicle, the battery pack enclosure having a first side member attached to a first side sill, and a second side member attached to a second side sill; and cross-members integrated into the battery pack enclosure, each of the cross-members extending from the first to the second side member, the cross-members segregating the battery pack enclosure into sections each configured to hold one or more battery modules, each cross-member comprising an upper portion and a lower portion, wherein a spacing between the upper and the lower portions is configured to receive a mounting bracket for at least one of the battery modules, and wherein the cross-members segregate the battery pack enclosure into full-width sections and at least one other section, each of the full-width sections fitting two battery modules side-by-side in a direction of travel, the other section fitting two stacked battery modules.

20. The energy absorbing and distributing side impact system of claim 19, wherein each of the first and second side sills comprises multiple longitudinal channels, at least an upper longitudinal channel positioned above a vehicle floor panel and at least a lower longitudinal channel positioned below the vehicle floor panel, wherein the first side member is attached to the lower longitudinal channel of the first side sill and the second side member is attached to the lower longitudinal channel of the second side sill.

\* \* \* \* \*